US012368635B1

(12) United States Patent
Radulescu-Banu et al.

(10) Patent No.: US 12,368,635 B1
(45) Date of Patent: Jul. 22, 2025

(54) LOAD BALANCING AND ENSURING AVAILABILITY FOR NETWORK SUBSCRIBER GROUPS

(71) Applicant: Juniper Networks, Inc., Sunnyvale, CA (US)

(72) Inventors: Cristina Radulescu-Banu, Lexington, MA (US); John E. Ziegler, Westborough, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 18/490,469

(22) Filed: Oct. 19, 2023

(51) Int. Cl.
*H04L 41/0654* (2022.01)
*H04L 41/0893* (2022.01)
*H04L 67/1004* (2022.01)

(52) U.S. Cl.
CPC ...... *H04L 41/0654* (2013.01); *H04L 41/0893* (2013.01); *H04L 67/1004* (2013.01)

(58) Field of Classification Search
CPC ............. H04L 41/0654; H04L 41/0893; H04L 41/0895; H04L 41/0813; H04L 45/22; H04L 47/125; H04L 49/70
See application file for complete search history.

(56) References Cited

U.S. PATENT DOCUMENTS

| | | | | |
|---|---|---|---|---|
| 5,515,034 A * | 5/1996 | Otsuka | ............... | H04Q 11/0428 340/9.11 |
| 9,088,619 B2 * | 7/2015 | Voit | .................... | H04L 61/5014 |
| 10,404,619 B1 * | 9/2019 | Agrawal | ................. | H04L 45/38 |
| 10,511,473 B2 * | 12/2019 | Melman | .................. | H04L 43/10 |
| 2002/0144024 A1 * | 10/2002 | Kumpf | .................. | G06F 13/102 710/12 |
| 2002/0184387 A1 * | 12/2002 | Yamaya | ................ | H04L 45/586 370/400 |
| 2007/0076734 A1 * | 4/2007 | Muniyappa | ............. | H04L 12/56 370/412 |
| 2013/0258838 A1 * | 10/2013 | Colven | ................. | H04L 49/552 370/390 |
| 2014/0099097 A1 * | 4/2014 | Zheng | ................. | H04L 41/0663 398/5 |
| 2016/0080695 A1 * | 3/2016 | Nocchi | .................. | H04N 7/155 348/14.09 |
| 2016/0380880 A1 * | 12/2016 | Swinkels | ................ | H04L 49/65 370/389 |
| 2018/0011763 A1 * | 1/2018 | Tanaka | ................ | G06F 11/1076 |
| 2022/0109642 A1 * | 4/2022 | Baizhiyenov | ........... | H04L 49/45 |

OTHER PUBLICATIONS

"TR-459 Multi-Service Disaggregated BNG with CUPS. Reference Architecture, Deployment Models, interface, and Protocol Specifications," Broadband Forum, Technical Report, Issue 2, Apr. 2023, 273 Pages.

* cited by examiner

*Primary Examiner* — Madhu Woolcock
(74) *Attorney, Agent, or Firm* — Harrity & Harrity, LLP

(57) ABSTRACT

A network device may assign subscriber groups to logical ports of the network device, and may generate a load balanced group that includes the logical ports assigned to the subscriber groups. The network device may provide a backup logical port for the load balanced group, and may maintain the backup logical port in an oversubscribed state or a full state. The network device may identify a subscriber group failure for one of the subscriber groups, and may switch the one of the subscriber groups to the backup logical port based on the subscriber group failure.

20 Claims, 7 Drawing Sheets

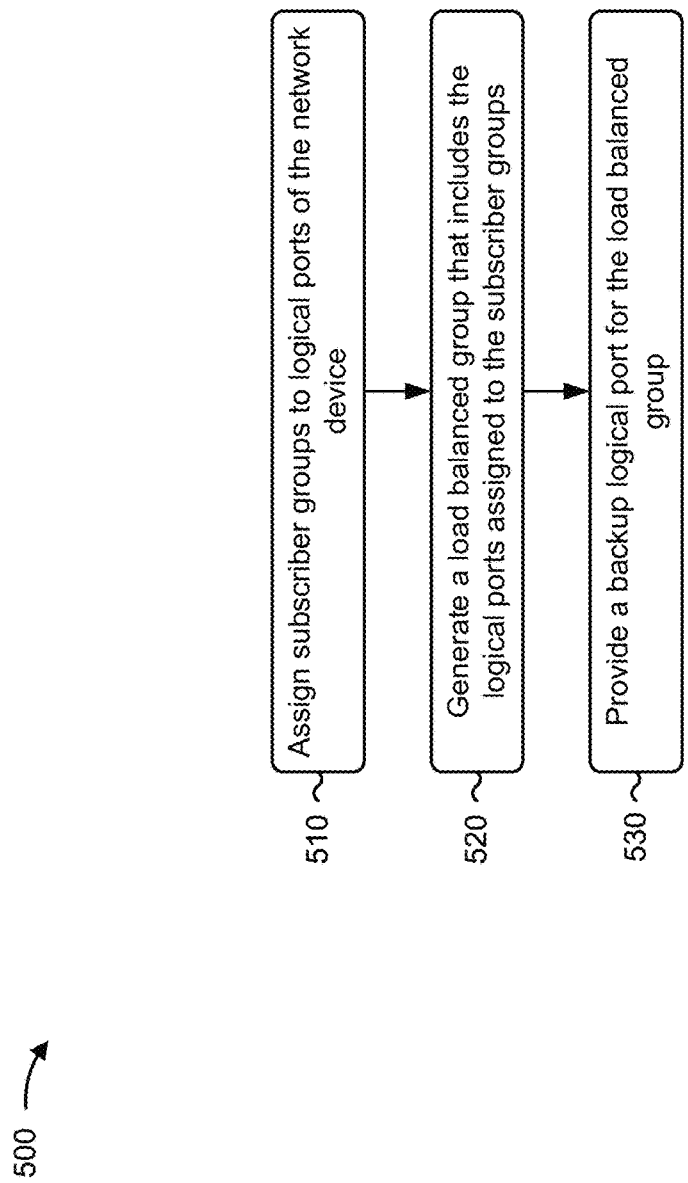

LOAD BALANCING AND ENSURING AVAILABILITY FOR NETWORK SUBSCRIBER GROUPS

BACKGROUND

A network device, such as a broadband network gateway (BNG), routes traffic to and from broadband remote access devices on an Internet service provider (ISP) network. The network device enables subscribers to connect to the broadband network, and performs authentication, authorization, and accounting; assigns Internet protocol (IP) addresses; and enforces quality of service (QOS) policies, among other examples.

SUMMARY

Some implementations described herein relate to a method. The method may include assigning subscriber groups to logical ports of a network device. The method may include generating a load balanced group that includes the logical ports assigned to the subscriber groups. The method may include providing a backup logical port for the load balanced group.

Some implementations described herein relate to a network device. The network device may include one or more memories and one or more processors. The one or more processors may be configured to assign subscriber groups to logical ports of the network device, and generate a load balanced group that includes the logical ports assigned to the subscriber groups. The one or more processors may be configured to provide a backup logical port for the load balanced group, and identify a subscriber group failure for one of the subscriber groups. The one or more processors may be configured to switch the one of the subscriber groups to the backup logical port based on the subscriber group failure.

Some implementations described herein relate to a non-transitory computer-readable medium that stores a set of instructions. The set of instructions, when executed by one or more processors of a network device, may cause the network device to assign subscriber groups to logical ports of the network device, and generate a load balanced group that includes the logical ports assigned to the subscriber groups. The set of instructions, when executed by one or more processors of the network device, may cause the network device to provide a backup logical port for the load balanced group, and maintain the backup logical port in an oversubscribed state or a full state. The set of instructions, when executed by one or more processors of the network device, may cause the network device to identify a subscriber group failure for one of the subscriber groups, and switch the one of the subscriber groups to the backup logical port based on the subscriber group failure.

BRIEF DESCRIPTION OF THE DRAWINGS

FIG. 5 is a flowchart of an example process for load balancing and ensuring availability for network subscriber groups.

DETAILED DESCRIPTION

Figure 1A:
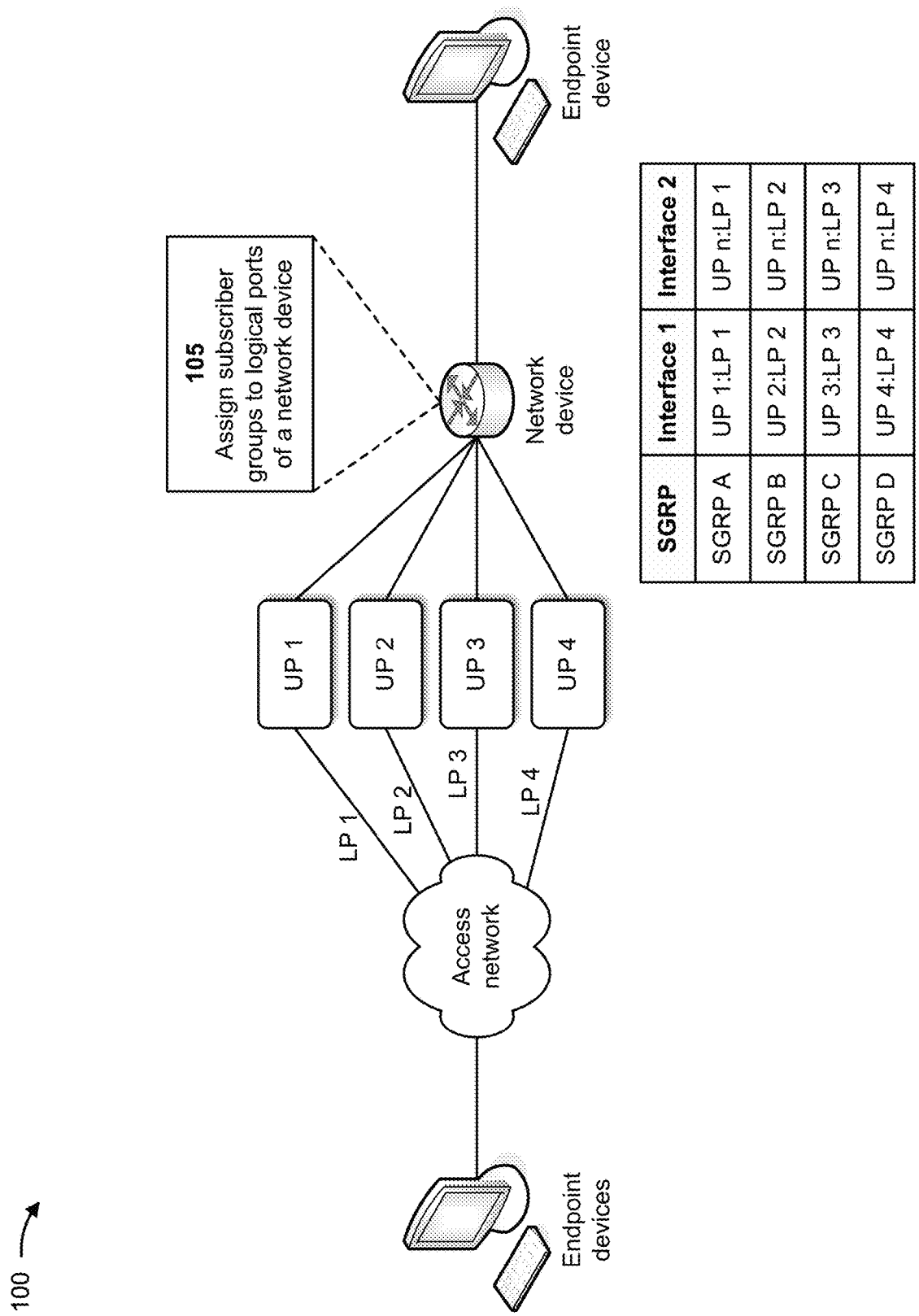
FIGS. 1A-1C are diagrams of an example associated with load balancing and ensuring availability for network subscriber groups.

The following detailed description of example implementations refers to the accompanying drawings. The same reference numbers in different drawings may identify the same or similar elements.

A network device may support intelligent load balancing based on percentage utilization of a user plane or based on provisioned weights. However, the intelligent load balancing model is unable to support resilient subscriber groups (e.g., groups of subscribers treated in a similar manner). Thus, when a port in a load balanced group experiences a failure, a subscriber group failover occurs (e.g., a logical port going down, core connectivity going down, and/or the like) and the load balanced subscriber groups fail to receive continuous traffic and services. Affected subscriber group sessions thus need to detect the failure and restart negotiations to reconnect to one of the remaining, eligible logical ports in a load balanced group. Thus, current techniques for handling when load balanced group experiences a failure consume computing resources (e.g., processing resources, memory resources, communication resources, and/or the like), networking resources, and/or the like, associated with failing to provide resilient subscriber groups, causing subscriber groups to restart negotiations with available logical ports in a load balanced group, causing subscriber groups to reconnect with available logical ports in the load balanced group, and/or the like.

Some implementations described herein relate to a network device that load balances and ensures availability for network subscriber groups. For example, the network device may assign subscriber groups to logical ports of the network device, and may generate a load balanced group that includes the logical ports assigned to the subscriber groups. The network device may provide a backup logical port for the load balanced group, and may maintain the backup logical port in an oversubscribed state or a full state. The network device may identify a subscriber group failure for one of the subscriber groups, and may switch the one of the subscriber groups to the backup logical port based on the subscriber group failure.

In this way, the network device load balances and ensures availability for network subscriber groups. For example, the network device may achieve enhanced load balancing across logical ports by associating load balanced subscriber groups across a quantity of user planes with a backup logical port. The logical ports of the network device may be associated with non-resilient subscriber groups, resilient subscriber groups, and load balanced subscriber groups. Thus, the network device conserves computing resources, networking resources, and/or the like that would otherwise have been consumed by failing to provide resilient subscriber groups, causing subscriber groups to restart negotiations with available logical ports in a load balanced group, causing subscriber groups to reconnect with available logical ports in the load balanced group, and/or the like.

Figure 1B:
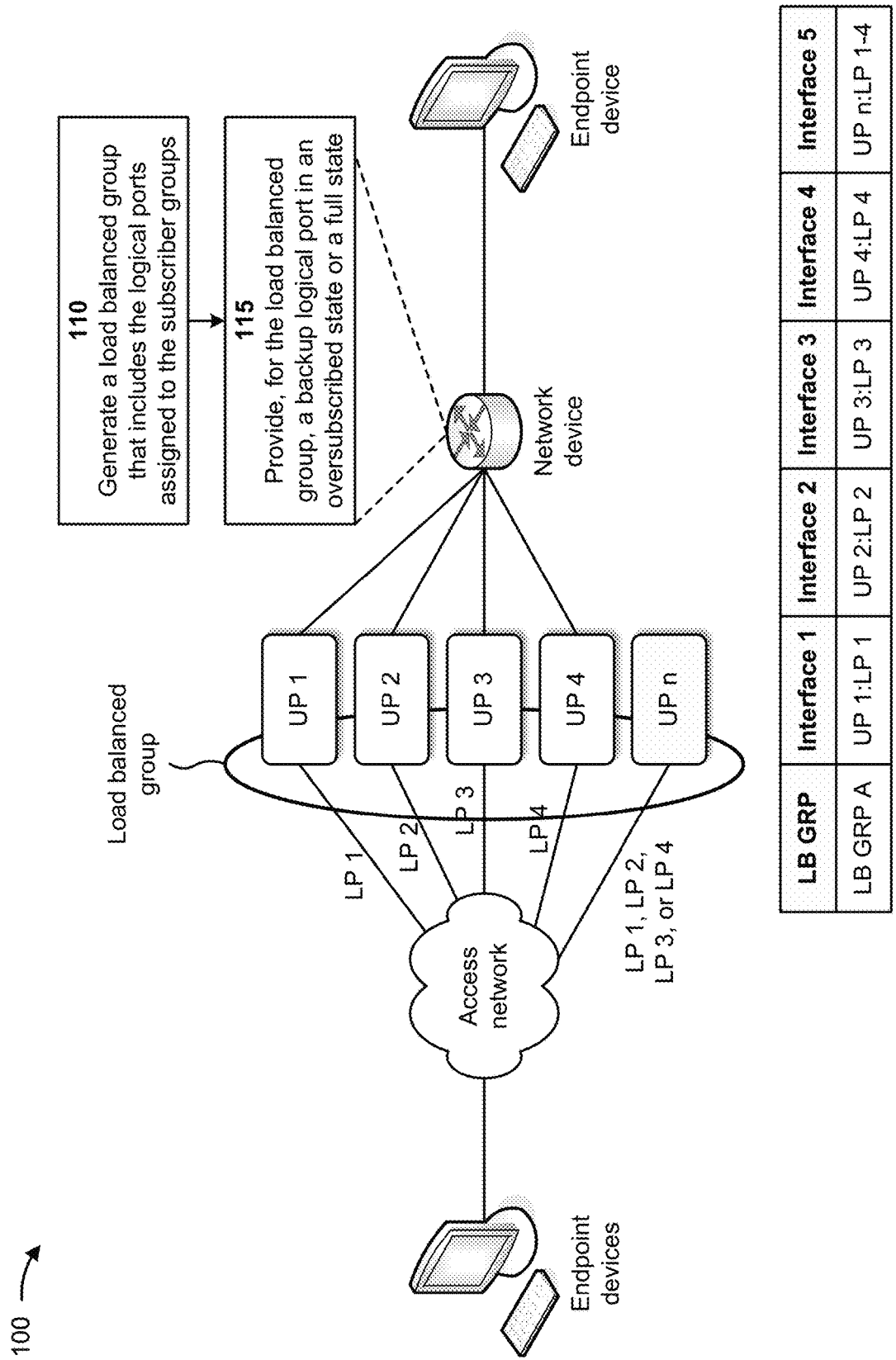
Figure 1C:
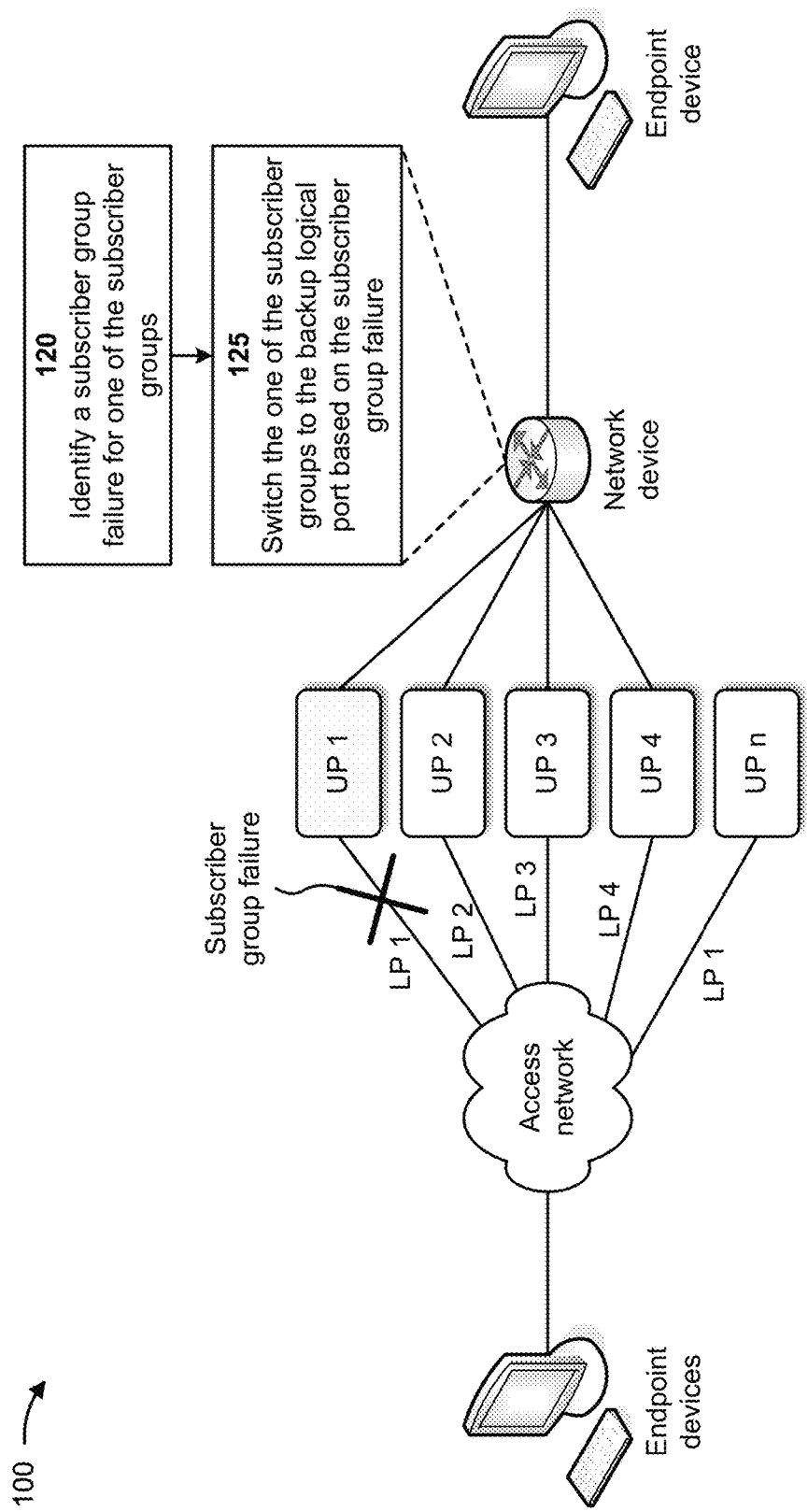

FIGS. 1A-1C are diagrams of an example 100 associated with load balancing and ensuring availability for network subscriber groups. As shown in FIGS. 1A-1C, example 100 includes endpoint devices and an access network associated with a network device. Further details of the endpoint device, the access network, and the network device are provided elsewhere herein.

As shown in FIG. 1A, the network device may include multiple logical ports, such as a first logical port (LP 1), a second logical port (LP 2), a third logical port (LP 3), and a fourth logical port (LP 4) associated with the access network and/or the endpoint devices. The first logical port may provide a first user plane (UP) interface (UP 1), the second logical port may provide a second UP interface (UP 2), the third logical port may provide a third UP interface (UP 3), and the fourth logical port may provide a fourth UP interface (UP 4).

As further shown in FIG. 1A, and by reference number 105, the network device may assign subscriber groups to logical ports of a network device. For example, the network device may route traffic to and from broadband remote access devices (e.g., the endpoint devices) on an ISP network. The network device may enable subscribers (e.g., associated with the endpoint devices) to connect to a broadband network (e.g., the ISP network), and may perform authentication, authorization, and accounting; may assign Internet protocol (IP) addresses; and may enforce QoS policies, among other examples. In some implementations, different endpoint devices may be associated with different subscribers to the broadband network, and the subscribers may be grouped into subscriber groups based on similarities of the subscribers (e.g., quality of service (QOS) requirements for the subscribers, service level agreements (SLAs) for the subscribers, endpoint devices associated with the subscribers, and/or the like). Each subscriber group may include a group of subscribers that treated in a similar manner. In some implementations, each of the subscriber groups may be control plane driven by the network device.

For example, as shown in the table of FIG. 1A, the network device may be associated with a first subscriber group (SGRP A), a second subscriber group (SGRP B), a third subscriber group (SGRP C), and a fourth subscriber group (SGRP D). The network device may assign the subscriber groups to the logical ports of the network devices. For example, the first subscriber group (SGRP A) may be assigned to a first interface (e.g., the first UP interface (UP 1) and the first logical port (LP 1)) and a second interface (e.g., an nth UP interface (UP n) and the first logical port (LP 1)). The second subscriber group (SGRP B) may be assigned to a first interface (e.g., the second UP interface (UP 2) and the second logical port (LP 2)) and a second interface (e.g., the nth UP interface (UP n) and the second logical port (LP 2)). The third subscriber group (SGRP C) may be assigned to a first interface (e.g., the third UP interface (UP 3) and the third logical port (LP 3)) and a second interface (e.g., the nth UP interface (UP n) and the third logical port (LP 3)). The fourth subscriber group (SGRP D) may be assigned to a first interface (e.g., the fourth UP interface (UP 4) and the fourth logical port (LP 4)) and a second interface (e.g., the nth UP interface (UP n) and the fourth logical port (LP 4)).

As shown in FIG. 1B, and by reference number 110, the network device may generate a load balanced group that includes the logical ports assigned to the subscriber groups. For example, when generating the load balanced group that includes the logical ports assigned to the subscriber groups, the network device may load balance the logical ports based on utilizations of the logical ports, based on provisioned weights for the logical ports, and/or the like. The network device may generate the load balanced group based on load balancing the logical ports. As shown in the table of FIG. 1B, the network device may generate a load balanced group (LB GRP A) that includes a first interface (e.g., the first UP interface (UP 1) and the first logical port (LP 1)), a second interface (e.g., the second UP interface (UP 2) and the second logical port (LP 2)), a third interface (e.g., the third UP interface (UP 3) and the third logical port (LP 3)), a fourth interface (e.g., the fourth UP interface (UP 4) and the fourth logical port (LP 4)), and a fifth interface (e.g., the nth UP interface (UP n) and the first through fourth logical ports (LP 1 through LP 4)). In some implementations, the fifth interface may correspond to a backup interface to be shared by the first interface through the fourth interface in the event of failure, as described below.

As further shown in FIG. 1B, and by reference number 115, the network device may provide, for the load balanced group, a backup logical port in an oversubscribed state or a full state. For example, the network device may designate a logical port of the network device (e.g., that is not utilized by the load balanced group) as a backup logical port (e.g., the nth UP interface, as shown in FIG. 1B) for the load balanced group. In some implementations, the network device may maintain the backup logical port in an oversubscribed state (e.g., asleep but available to be utilized by one of the logical ports of the load balanced group in the event of failure) or a full state (e.g., energized and available to be utilized by one of the logical ports of the load balanced group in the event of failure). In some implementations, the backup logical port may be a backup for all of the logical ports included in the load balanced group. In some implementations, the backup logical port may be shared by all of the subscriber groups associated with the logical ports included in the load balanced group.

As shown in FIG. 1C, and by reference number 120, the network device may identify a subscriber group failure for one of the subscriber groups. For example, the network device may monitor the logical ports included in the load balanced group for failures. In some implementations, the network device may not identify a failure in the logical ports included in the load balanced group based on the monitoring. In such implementations, the network device may continue to utilize the logical ports of the load balanced group. Alternatively, the network device may identify a failure in a logical port included in the load balanced group based on the monitoring. Such a failure may be referred to as a subscriber group failure for one of the subscriber groups. For example, as shown in FIG. 1C, the network device may identify a subscriber group failure associated with the first UP interface (UP 1) and the first logical port (LP 1). The subscriber group failure may be associated with one of the subscriber groups (e.g., the first subscriber group (SGRP A)). In some implementations, the subscriber group failure may be caused by a failure of one of the logical ports assigned to the one of the subscriber groups, a failure of core connectivity for the one of the logical ports assigned to the one of the subscriber groups, and/or the like.

As further shown in FIG. 1C, and by reference number 125, the network device may switch the one of the subscriber groups to the backup logical port based on the subscriber group failure. For example, when the network device identifies the subscriber group failure for the one of the subscriber groups, the network device may switch the one of the subscriber groups to the backup logical port. In one example, as shown in FIG. 1C, the network device may switch the first subscriber group (SGRP A) (e.g., associated with the first UP interface (UP 1) and the first logical port (LP 1)) to the backup logical port (UP n). In some implementations, when switching the one of the subscriber groups to the backup logical port, the network device may switch the one of the subscriber groups to the backup logical port without reconnecting the one of the subscriber groups to one of the logical ports. In some implementations, when switching the one of the subscriber groups to the backup logical port, the network device may utilize a control plane to switch the one of the subscriber groups to the backup logical port, may utilize a user plane to switch the one of the subscriber groups to the backup logical port, and/or the like.

When the network device determines that the subscriber group failure has been corrected, the network device may switch the one of the subscriber groups from the backup logical port back to an original logical port associated with the one of the subscriber groups. For example, the network device may switch the first subscriber group (SGRP A) from the backup logical port (UP n) back to the first UP interface (UP 1) and the first logical port (LP 1) when the subscriber group failure has been corrected.

In this way, the network device load balances and ensures availability for network subscriber groups. For example, the network device may achieve enhanced load balancing across logical ports by associating load balanced subscriber groups across a quantity of user planes with a backup logical port. The logical ports of the network device may be associated with non-resilient subscriber groups, resilient subscriber groups, and load balanced subscriber groups. Thus, the network device conserves computing resources, networking resources, and/or the like that would otherwise have been consumed by failing to provide resilient subscriber groups, causing subscriber groups to restart negotiations with available logical ports in a load balanced group, causing subscriber groups to reconnect with available logical ports in the load balanced group, and/or the like.

As indicated above, FIGS. 1A-1C are provided as an example. Other examples may differ from what is described with regard to FIGS. 1A-1C. The number and arrangement of devices shown in FIGS. 1A-1C are provided as an example. In practice, there may be additional devices, fewer devices, different devices, or differently arranged devices than those shown in FIGS. 1A-1C. Furthermore, two or more devices shown in FIGS. 1A-1C may be implemented within a single device, or a single device shown in FIGS. 1A-1C may be implemented as multiple, distributed devices. Additionally, or alternatively, a set of devices (e.g., one or more devices) shown in FIGS. 1A-1C may perform one or more functions described as being performed by another set of devices shown in FIGS. 1A-1C.

Figure 2:
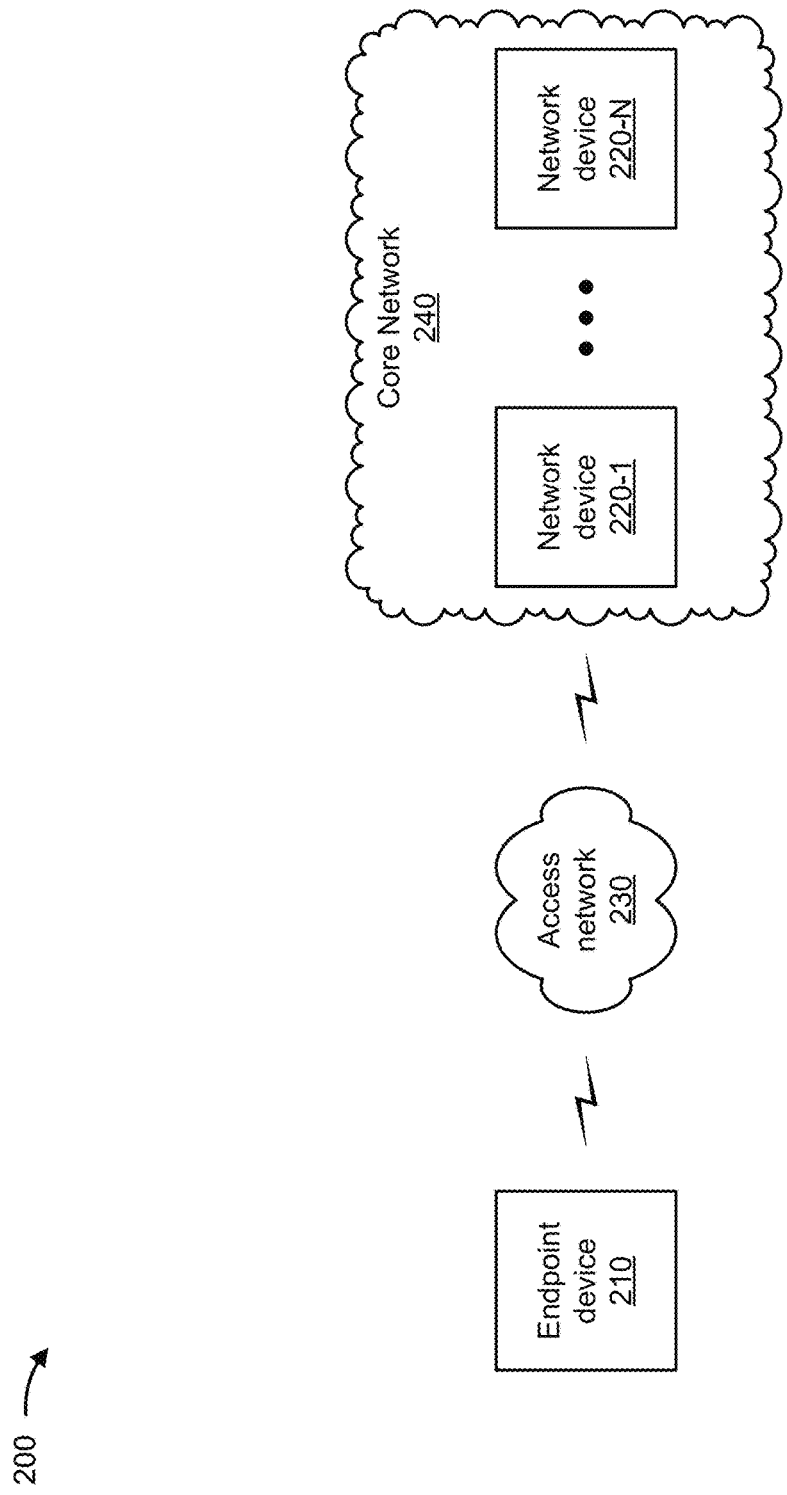
FIG. 2 is a diagram of an example environment in which systems and/or methods described herein may be implemented.

FIG. 2 is a diagram of an example environment 200 in which systems and/or methods described herein may be implemented. As shown in FIG. 2, the environment 200 may include an endpoint device 210, a group of network devices 220 (shown as network device 220-1 through network device 220-N), an access network 230, and a core network 240. Devices of the environment 200 may interconnect via wired connections, wireless connections, or a combination of wired and wireless connections.

The endpoint device 210 includes one or more devices capable of receiving, generating, storing, processing, and/or providing information, such as information described herein. For example, the endpoint device 210 may include a mobile phone (e.g., a smart phone or a radiotelephone), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, or a head mounted display), a network device, or a similar type of device. In some implementations, the endpoint device 210 may receive network traffic from and/or may provide network traffic to other endpoint devices 210, via the access network 230 and the core network 240 (e.g., by routing packets using the network devices 220 as intermediaries).

The network device 220 includes one or more devices capable of receiving, processing, storing, routing, and/or providing traffic (e.g., a packet or other information or metadata) in a manner described herein. For example, the network device 220 may include a router, such as a label switching router (LSR), a label edge router (LER), an ingress router, an egress router, a provider router (e.g., a provider edge router or a provider core router), a virtual router, or another type of router. Additionally, or alternatively, the network device 220 may include a gateway, a switch, a firewall, a hub, a bridge, a reverse proxy, a server (e.g., a proxy server, a cloud server, or a data center server), a load balancer, and/or a similar device. In some implementations, the network device 220 may be a physical device implemented within a housing, such as a chassis. In some implementations, the network device 220 may be a virtual device implemented by one or more computer devices of a cloud computing environment or a data center. In some implementations, a group of network devices 220 may be a group of data center nodes that are used to route traffic flow through the core network 240.

The access network 230 may include one or more wired and/or wireless networks. For example, the access network 230 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The access network 230 enables communication among the devices of the environment 200.

The core network 240 includes one or more wired and/or wireless networks. For example, the core network 240 may include a packet switched network, a cellular core network (e.g., a 5G core network, a 4G core network, such as an LTE core network, or a third generation (3G) network), a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
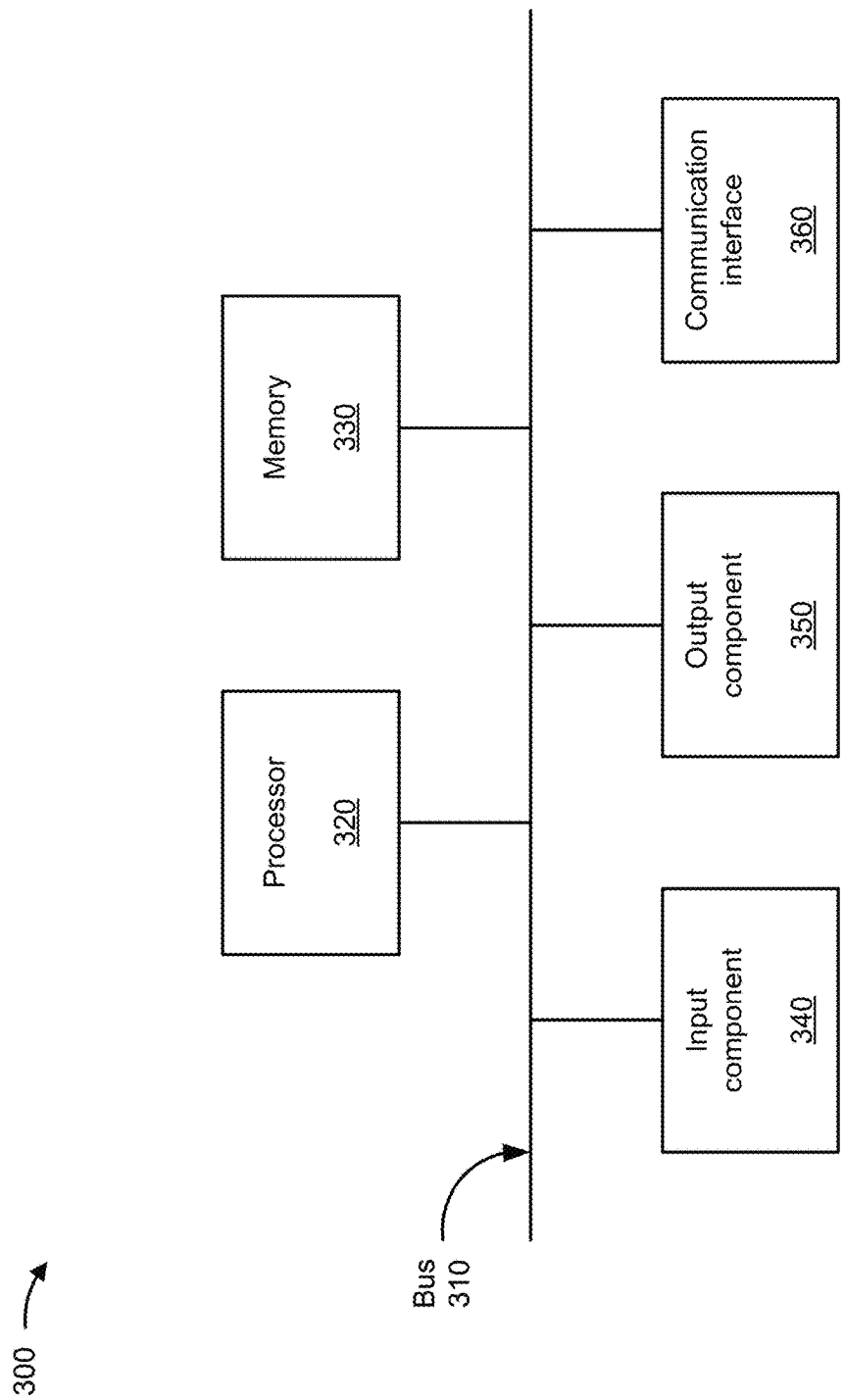
FIGS. 3 and 4 are diagrams of example components of one or more devices of FIG. 2.

FIG. 3 is a diagram of example components of one or more devices of FIG. 2. The example components may be included in a device 300, which may correspond to the endpoint device 210 and/or the network device 220. In some implementations, the endpoint device 210 and/or the network device 220 may include one or more devices 300 and/or one or more components of the device 300. As shown in FIG. 3, the device 300 may include a bus 310, a processor 320, a memory 330, an input component 340, an output component 350, and a communication interface 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit (CPU), a graphics processing unit (GPU), a microprocessor, a controller, a microcontroller, a digital signal processor (DSP), a field-programmable gate array (FPGA), an application-specific integrated circuit (ASIC), and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication interface 360 enables the device 300 to communicate with other devices via a wired connection and/or a wireless connection. For example, the communication interface 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
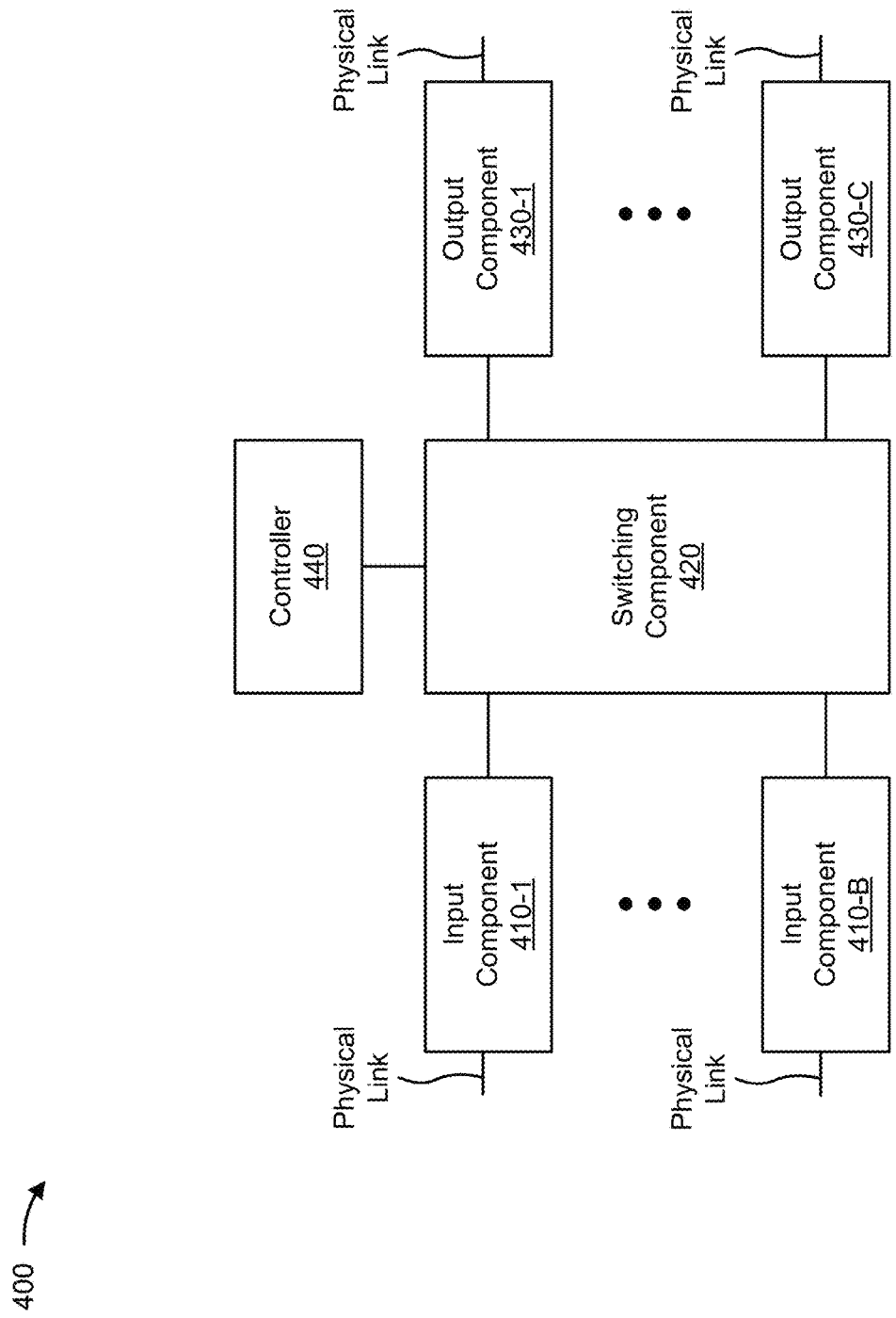

FIG. 4 is a diagram of example components of one or more devices of FIG. 2. The example components may be included in a device 400. The device 400 may correspond to the network device 220. In some implementations, the network device 220 may include one or more devices 400 and/or one or more components of the device 400. As shown in FIG. 4, the device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

The input component 410 may be one or more points of attachment for physical links and may be one or more points of entry for incoming traffic, such as packets. The input component 410 may process incoming traffic, such as by performing data link layer encapsulation or decapsulation. In some implementations, the input component 410 may transmit and/or receive packets. In some implementations, the input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, the device 400 may include one or more input components 410.

The switching component 420 may interconnect the input components 410 with the output components 430. In some implementations, the switching component 420 may be implemented via one or more crossbars, via busses, and/or with shared memories. The shared memories may act as temporary buffers to store packets from the input components 410 before the packets are eventually scheduled for delivery to the output components 430. In some implementations, the switching component 420 may enable the input components 410, the output components 430, and/or the controller 440 to communicate with one another.

The output component 430 may store packets and may schedule packets for transmission on output physical links. The output component 430 may support data link layer encapsulation or decapsulation, and/or a variety of higher-level protocols. In some implementations, the output component 430 may transmit packets and/or receive packets. In some implementations, the output component 430 may include an output line card that includes one or more packet processing components (e.g., in the form of integrated circuits), such as one or more IFCs, packet forwarding components, line card controller components, output ports, processors, memories, and/or output queues. In some implementations, the device 400 may include one or more output components 430. In some implementations, the input component 410 and the output component 430 may be implemented by the same set of components (e.g., and input/output component may be a combination of the input component 410 and the output component 430).

The controller 440 includes a processor in the form of, for example, a CPU, a GPU, an accelerated processing unit (APU), a microprocessor, a microcontroller, a DSP, an FPGA, an ASIC, and/or another type of processor. The processor is implemented in hardware, firmware, or a combination of hardware and software. In some implementations, the controller 440 may include one or more processors that can be programmed to perform a function.

In some implementations, the controller 440 may include a RAM, a ROM, and/or another type of dynamic or static storage device (e.g., a flash memory, a magnetic memory, an optical memory, etc.) that stores information and/or instructions for use by the controller 440.

In some implementations, the controller 440 may communicate with other devices, networks, and/or systems connected to the device 400 to exchange information regarding network topology. The controller 440 may create routing tables based on the network topology information, may create forwarding tables based on the routing tables, and may forward the forwarding tables to the input components 410 and/or output components 430. The input components 410 and/or the output components 430 may use the forwarding tables to perform route lookups for incoming and/or outgoing packets.

The controller 440 may perform one or more processes described herein. The controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with the controller 440 from another computer-readable medium or from another device via a communication interface. When executed, software instructions stored in a memory and/or storage component associated with the controller 440 may cause the controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, the device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

FIG. 5 is a flowchart of an example process 500 for load balancing and ensuring availability for network subscriber groups. In some implementations, one or more process blocks of FIG. 5 may be performed by a network device (e.g., the network device 220). In some implementations, one or more process blocks of FIG. 5 may be performed by another device or a group of devices separate from or including the network device. Additionally, or alternatively, one or more process blocks of FIG. 5 may be performed by one or more components of the device 300, such as the processor 320, the memory 330, the input component 340, the output component 350, and/or the communication interface 360. Additionally, or alternatively, one or more process blocks of FIG. 5 may be performed by one or more components of the device 400, such as the input component 410, the switching component 420, the output component 430, and/or the controller 440.

As shown in FIG. 5, process 500 may include assigning subscriber groups to logical ports of the network device (block 510). For example, the network device may assign subscriber groups to logical ports of the network device, as described above. In some implementations, each of the subscriber groups is control plane driven. In some implementations, the network device is a broadband network gateway.

As further shown in FIG. 5, process 500 may include generating a load balanced group that includes the logical ports assigned to the subscriber groups (block 520). For example, the network device may generate a load balanced group that includes the logical ports assigned to the subscriber groups, as described above. In some implementations, generating the load balanced group that includes the logical ports assigned to the subscriber groups includes identifying utilizations of the logical ports, and generating the load balanced group based on the utilizations of the logical ports.

In some implementations, generating the load balanced group includes identifying provisioned weights for the logical ports, and generating the load balanced group based on the provisioned weights for the logical ports. In some implementations, generating the load balanced group includes load balancing the logical ports based on utilizations of the logical ports or provisioned weights for the logical ports, and generating the load balanced group based on load balancing the logical ports.

As further shown in FIG. 5, process 500 may include providing a backup logical port for the load balanced group (block 530). For example, the network device may provide a backup logical port for the load balanced group, as described above. In some implementations, the backup logical port is a backup for all of the logical ports of the load balanced group. In some implementations, the backup logical port is shared by all of the subscriber groups.

In some implementations, process 500 includes maintaining the backup logical port in an oversubscribed state or a full state. In some implementations, process 500 includes identifying a subscriber group failure for one of the subscriber groups, and switching the one of the subscriber groups to the backup logical port based on the subscriber group failure. In some implementations, switching the one of the subscriber groups to the backup logical port includes switching the one of the subscriber groups to the backup logical port without reconnecting the one of the subscriber groups to one of the logical ports.

In some implementations, switching the one of the subscriber groups to the backup logical port includes one of utilizing a control plane to switch the one of the subscriber groups to the backup logical port, or utilizing a user plane to switch the one of the subscriber groups to the backup logical port. In some implementations, the subscriber group failure is caused by one of a failure of one of the logical ports assigned to the one of the subscriber groups or failure of core connectivity for the one of the logical ports assigned to the one of the subscriber groups.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code-it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method, comprising:
   grouping, by a network device routing traffic over a network to and from endpoint devices, subscribers associated with at least one of the endpoint devices into subscriber groups;
   assigning, by the network device, each of the subscriber groups to user plane interfaces of a plurality of user plane interfaces and logical ports of a plurality of logical ports of the network device,
      wherein one of the subscriber groups is assigned a first user plane interface of the plurality of user plane interfaces to be paired with a first logical port of the plurality of logical ports, and
      wherein the one of the subscriber groups is assigned a second user plane interface of the plurality of user plane interfaces to be paired with the first logical port;
   generating, by the network device, a load balanced group that includes each of the logical ports and each of the user plane interfaces assigned to each of the subscriber groups,
      wherein the load balanced group is further generated to include a plurality of pairs of the user plane interfaces and the logical ports corresponding to the user plane interfaces and the logical ports assigned to the subscriber groups; and
   providing, by the network device for the load balanced group, the second user plane interface as a backup user plane interface to be shared by other user plane interfaces of the user plane interfaces with a backup logical port of the network device to be shared by the subscriber groups in an event of a subscriber group failure,
      wherein the backup logical port is provided in an oversubscribed state or a full state available to be utilized by any of the logical ports of any of the subscriber groups in the event of the subscriber group failure;
   monitoring each of the logical ports assigned to each of the subscriber groups for a connectivity failure;
   identifying, based on the monitoring, a subscriber group failure of the first logical port; and
   switching, based on identifying the subscriber group failure, the one of the subscriber groups to the backup logical port without reconnecting the one of the subscriber groups to one of the logical ports.

2. The method of claim 1, wherein switching the one of the subscriber groups to the backup logical port comprises one of:
   utilizing a control plane to switch the one of the subscriber groups to the backup logical port; or
   utilizing a user plane to switch the one of the subscriber groups to the backup logical port.

3. The method of claim 1, wherein a failure of the one of the subscriber groups is caused by one of a failure of one of the logical ports assigned to the one of the subscriber groups or failure of core connectivity for the one of the logical ports assigned to the one of the subscriber groups.

4. The method of claim 1, further comprising:
   maintaining the backup logical port in the oversubscribed state or the full state.

5. The method of claim 1, wherein generating the load balanced group that includes a subset of the logical ports assigned to the subscriber groups comprises:
   identifying utilizations of the subset of the logical ports; and
   generating the load balanced group based on the utilizations of the subset of the logical ports.

6. The method of claim 1, wherein generating the load balanced group comprises:
   identifying provisioned weights for the logical ports; and
   generating the load balanced group based on the provisioned weights for the logical ports.

7. The method of claim 1, wherein each of the subscriber groups is control plane driven.

8. A network device, comprising:
one or more memories; and
one or more processors to:
  group, by the network device configured to route traffic over a network to and from endpoint devices, subscribers associated with at least one of the endpoint devices into subscriber groups;
  assign each of the subscriber groups to user plane interfaces of a plurality of user plane interfaces and logical ports of a plurality of logical ports of the network device,
    wherein one of the subscriber groups is assigned a first user plane interface of the plurality of user plane interfaces to be paired with a first logical port of the plurality of logical ports, and
    wherein the one of the subscriber groups is assigned a second user plane interface of the plurality of user plane interfaces to be paired with the first logical port;
  generate a load balanced group that includes each of the logical ports and each of the user plane interfaces assigned to each of the subscriber groups,
    wherein the load balanced group is further generated to include a plurality of pairs of the user plane interfaces and the logical ports corresponding to the user plane interfaces and the logical ports assigned to the subscriber groups;
  provide, for the load balanced group, the second user plane interface as a backup user plane interface to be shared by other user plane interfaces with a backup logical port of the network device to be shared by the subscriber groups in an event of a subscriber group failure,
    wherein the backup logical port is provided in an oversubscribed state or a full state available to be utilized by any of the logical ports of any of the subscriber groups in the event of the subscriber group failure;
  monitor each of the logical ports assigned to each of the subscriber groups for a connectivity failure;
  identify, based on the monitoring, a subscriber group failure of the first logical port; and
  switch, based on identifying the subscriber group failure, the one of the subscriber groups to the backup logical port without reconnecting the one of the subscriber groups to one of the logical ports.

9. The network device of claim 8, wherein the one or more processors, to generate the load balanced group, are to:
  identify provisioned weights for the logical ports; and
  generate the load balanced group based on the provisioned weights for the logical ports.

10. The network device of claim 8, wherein each of the subscriber groups is control plane driven.

11. The network device of claim 8, wherein the network device is a broadband network gateway.

12. The network device of claim 8, wherein the one or more processors, to generate the load balanced group, are to:
  load balance the logical ports based on utilizations of the logical ports or provisioned weights for the logical ports; and
  generate the load balanced group based on load balancing the logical ports.

13. The network device of claim 8, wherein the failure of the one of the subscriber groups is caused by one of a failure of one of the logical ports assigned to the one of the subscriber groups, or failure of core connectivity for the one of the logical ports assigned to the one of the subscriber groups.

14. A non-transitory computer-readable medium storing a set of instructions, the set of instructions comprising:
  one or more instructions that, when executed by one or more processors of a network device, cause the network device to:
    group, by the network device routing traffic over a network to and from endpoint devices, subscribers associated with at least one of the endpoint devices into subscriber groups;
    assign each of the subscriber groups to user plane interfaces of a plurality of user plane interfaces and logical ports of a plurality of logical ports of the network device,
      wherein one of the subscriber groups is assigned a first user plane interface of the plurality of user plane interfaces to be paired with a first logical port of the plurality of logical ports, and is assigned a second user plane interface of the plurality of user plane interfaces to be paired with the first logical port;
    generate a load balanced group that includes each of the logical ports and each of the user plane interfaces assigned to each of the subscriber groups,
      wherein the load balanced group is further generated to include a plurality of pairs of the user plane interfaces and the logical ports corresponding to the user plane interfaces and the logical ports assigned to the subscriber groups;
    provide, for the load balanced group, the second user plane interface as a backup user plane interface to be shared by other user plane interfaces with a backup logical port of the network device to be shared by the subscriber groups in an event of a subscriber group failure,
      wherein the backup logical port is provided in an oversubscribed state or a full state available to be utilized by any of the logical ports of any of the subscriber groups in the event of the subscriber group failure;
    monitor each of the logical ports assigned to each of the subscriber groups for a connectivity failure;
    identify a subscriber group failure of the first logical port; and
    switch, based on identifying the subscriber group failure, the one of the subscriber groups to the backup logical port without reconnecting the one of the subscriber groups to one of the logical ports.

15. The non-transitory computer-readable medium of claim 14, wherein the one or more instructions, that cause the network device to switch the one of the subscriber groups to the backup logical port, cause the network device to:
  utilize a control plane to switch the one of the subscriber groups to the backup logical port; or
  utilize a user plane to switch the one of the subscriber groups to the backup logical port.

16. The non-transitory computer-readable medium of claim 14, wherein the one or more instructions, that cause the network device to generate the load balanced group, cause the network device to:
  identify utilizations of the logical ports; and
  generate the load balanced group based on the utilizations of the logical ports.

17. The non-transitory computer-readable medium of claim 14, wherein the one or more instructions, that cause the network device to generate the load balanced group, cause the network device to:
  identify provisioned weights for the logical ports; and
  generate the load balanced group based on the provisioned weights for the logical ports.

18. The non-transitory computer-readable medium of claim 14, wherein the one or more instructions, that cause the network device to generate the load balanced group, cause the network device to:
  load balance the logical ports based on utilizations of the logical ports or provisioned weights for the logical ports; and
  generate the load balanced group based on load balancing the logical ports.

19. The non-transitory computer-readable medium of claim 14, wherein each of the subscriber groups is control plane driven.

20. The non-transitory computer-readable medium of claim 14, wherein a failure of the one of the subscriber groups is caused by one of a failure of one of the logical ports assigned to the one of the subscriber groups, or failure of core connectivity for the one of the logical ports assigned to the one of the subscriber groups.

* * * * *